(12) United States Patent
Shinohara

(10) Patent No.: US 7,830,622 B2
(45) Date of Patent: Nov. 9, 2010

(54) IMAGING LENS

(75) Inventor: Yoshikazu Shinohara, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 167 days.

(21) Appl. No.: 11/727,617

(22) Filed: Mar. 27, 2007

(65) Prior Publication Data

US 2007/0229987 A1 Oct. 4, 2007

(30) Foreign Application Priority Data

Mar. 28, 2006 (JP) .................. P2006-087409

(51) Int. Cl.
*G02B 9/12* (2006.01)
*G02B 13/18* (2006.01)
(52) U.S. Cl. .............. 359/784; 359/791; 359/716
(58) Field of Classification Search .......... 359/784–792
See application file for complete search history.

(56) References Cited

U.S. PATENT DOCUMENTS

| 6,795,253 | B2 | 9/2004 | Shinohara et al. | |
|---|---|---|---|---|
| 6,977,779 | B2 | 12/2005 | Shinohara | |
| 7,145,736 | B2 * | 12/2006 | Noda | 359/785 |
| 7,184,225 | B1 * | 2/2007 | Noda | 359/784 |
| 7,199,948 | B1 * | 4/2007 | Sato | 359/785 |
| 7,408,725 | B2 * | 8/2008 | Sato | 359/785 |

FOREIGN PATENT DOCUMENTS

| JP | 2003-322792 A | 11/2003 |
|---|---|---|
| JP | 2004-219807 A | 8/2004 |
| JP | 2004-240063 A | 8/2004 |
| JP | 2004-317743 A | 11/2004 |
| JP | 2005-227755 A | 8/2005 |
| JP | 2005-292235 A | 10/2005 |
| WO | WO-2005/119326 A1 | 12/2005 |

OTHER PUBLICATIONS

European Patent Office Communication pursuant to Article 94(3), dated Aug. 7, 2009.

* cited by examiner

*Primary Examiner*—Jordan M. Schwartz
(74) *Attorney, Agent, or Firm*—Birch, Stewart, Kolasch & Birch, LLP

(57) ABSTRACT

An imaging lens comprises, in order from an object side: an aperture stop; a first lens having a positive refractive power in a meniscus form having a convex surface facing toward the object; a second lens having a positive or negative refractive power in a meniscus form having a concave surface facing toward the object; and a third lens having a positive or negative refractive power in an aspheric form at both surfaces, wherein conditional expressions given below are satisfied:

$$vd1>50 \quad (1)$$

$$vd3>50 \quad (2)$$

$$0.7<f1/f<1.0 \quad (3)$$

$$-0.9<f2/\{f3\cdot(45-vd2)\}<0.4 \quad (4)$$

where
vd1: Abbe number of the first lens,
vd2: Abbe number of the second lens,
vd3: Abbe number of the third lens,
f: Focal length of an overall system,
f1: focal length of the first lens,
f2: focal length of the second lens, and
f3: focal length of the third lens.

18 Claims, 24 Drawing Sheets

EXAMPLE 1

FIG. 10A

| | EXAMPLE 1, BASIC LENS DATA | | | |
|---|---|---|---|---|
| Si (SURFACE NO.) | Ri (RADIUS OF CURVATURE) | Di (SURFACE TO SURFACE INTERVAL) | Ndi (REFRACTIVE INDEX) | νdj (ABBE NUMBER) |
| 1 (STOP) | — | −0.13 | 1.0 | |
| G1 { 2 | 1.6143 | 0.77499 | 1.51081 | 56 |
| 3 | 8.742 | 0.82702 | 1.0 | |
| G2 { 4 | −1.5176 | 0.60078 | 1.533308 | 56 |
| 5 | −1.8792 | 0.2471 | 1.0 | |
| G3 { 6 | 3.3059 | 0.94019 | 1.51081 | 56 |
| 7 | 2.3748 | 0.675 | 1.0 | |
| GC { 8 | ∞ | 0.3 | 1.518249 | 64.1 |
| 9 | ∞ | 0.68546 | 1.0 | |

FIG. 10B

| | EXAMPLE 1, ASPHERIC DATA | | |
|---|---|---|---|
| ASPHERIC COEFFICIENT | SURFACE NO. | | |
| | SECOND SURFACE | THIRD SURFACE | FOURTH SURFACE |
| KA | 0.563728 | 1 | 1.407956 |
| $B_3$ | 1.52E−03 | −1.55E−02 | −9.67E−02 |
| $B_4$ | 3.95E−03 | 1.92E−01 | 2.00E−01 |
| $B_5$ | −4.62E−02 | −6.41E−01 | −2.19E−01 |
| $B_6$ | 1.15E−01 | 5.86E−01 | 3.40E−02 |
| $B_7$ | −1.15E−02 | 8.68E−01 | −2.00E−01 |
| $B_8$ | −9.28E−02 | −2.55E+00 | 3.39E−01 |
| $B_9$ | −2.84E−02 | 2.23E+00 | 4.18E−01 |
| $B_{10}$ | 7.26E−02 | −7.05E−01 | −4.71E−01 |
| | FIFTH SURFACE | SIXTH SURFACE | SEVENTH SURFACE |
| KA | −0.26503 | −58.2204 | −14.1449 |
| $B_3$ | −2.32E−01 | −1.22E−01 | 8.30E−03 |
| $B_4$ | 1.22E−01 | −7.30E−02 | −1.19E−01 |
| $B_5$ | 6.38E−02 | 4.65E−02 | 6.16E−02 |
| $B_6$ | −1.44E−01 | 2.45E−02 | 4.79E−03 |
| $B_7$ | −2.99E−02 | −1.22E−03 | −1.51E−02 |
| $B_8$ | 1.39E−01 | −8.36E−03 | −3.51E−04 |
| $B_9$ | 1.17E−01 | −2.63E−03 | 3.91E−03 |
| $B_{10}$ | −1.04E−01 | 2.53E−03 | −1.07E−03 |

FIG. 11A

| | EXAMPLE 2, BASIC LENS DATA | | | | |
|---|---|---|---|---|---|
| | Si (SURFACE NO.) | Ri (RADIUS OF CURVATURE) | Di (SURFACE TO SURFACE INTERVAL) | Ndi (REFRACTIVE INDEX) | vdj (ABBE NUMBER) |
| | 1 (STOP) | — | −0.13 | 1.0 | |
| G1 | 2 | 1.8652 | 0.71559 | 1.51081 | 56 |
| | 3 | 11.3066 | 1.27911 | 1.0 | |
| G2 | 4 | −2.5353 | 0.70387 | 1.51081 | 56 |
| | 5 | −1.7771 | 0.08342 | 1.0 | |
| G3 | 6 | 2.9178 | 0.70007 | 1.51081 | 56 |
| | 7 | 1.3055 | 0 | 1.0 | |
| GC | 8 | ∞ | 0.4 | 1.518249 | 64.1 |
| | 9 | ∞ | 0.52897 | 1.0 | |

FIG. 11B

| | EXAMPLE 2, ASPHERIC DATA | | |
|---|---|---|---|
| ASPHERIC COEFFICIENT | SURFACE NO. | | |
| | SECOND SURFACE | THIRD SURFACE | FOURTH SURFACE |
| KA | 0.2794938 | 1 | −0.302214 |
| $B_3$ | −1.73E−02 | −2.75E−02 | 6.10E−02 |
| $B_4$ | 3.84E−02 | 2.64E−01 | −3.07E−01 |
| $B_5$ | −1.10E−01 | −8.85E−01 | 2.76E−01 |
| $B_6$ | 2.88E−01 | 8.78E−01 | 2.59E−01 |
| $B_7$ | −1.15E−01 | 1.02E+00 | −6.46E−01 |
| $B_8$ | −3.66E−01 | −2.83E+00 | −4.21E−03 |
| $B_9$ | 2.48E−01 | 1.96E+00 | 5.80E−01 |
| $B_{10}$ | 6.81E−02 | −3.89E−01 | −2.80E−01 |
| | FIFTH SURFACE | SIXTH SURFACE | SEVENTH SURFACE |
| KA | −1.471089 | −412.6329 | −8.687669 |
| $B_3$ | −3.97E−01 | −9.62E−02 | 9.45E−02 |
| $B_4$ | 2.75E−01 | −1.66E−01 | −2.50E−01 |
| $B_5$ | 1.70E−01 | 7.34E−02 | 1.13E−01 |
| $B_6$ | −1.94E−01 | 4.43E−02 | 2.20E−02 |
| $B_7$ | −1.62E−01 | −6.52E−03 | −3.75E−02 |
| $B_8$ | 1.19E−01 | −4.26E−03 | 1.05E−02 |
| $B_9$ | 1.20E−01 | −7.19E−03 | 2.29E−04 |
| $B_{10}$ | −6.91E−02 | 3.65E−03 | −4.25E−04 |

FIG. 12A

| | EXAMPLE 3, BASIC LENS DATA | | | |
|---|---|---|---|---|
| Si (SURFACE NO.) | Ri (RADIUS OF CURVATURE) | Di (SURFACE TO SURFACE INTERVAL) | Ndi (REFRACTIVE INDEX) | vdj (ABBE NUMBER) |
| 1 (STOP) | — | -0.13 | 1.0 | |
| G1 { 2 | 1.6196 | 0.77847 | 1.51081 | 56 |
| 3 | 8.8671 | 0.83247 | 1.0 | |
| G2 { 4 | -1.5494 | 0.60078 | 1.533308 | 56 |
| 5 | -1.981 | 0.24858 | 1.0 | |
| G3 { 6 | 3.1911 | 0.95476 | 1.51081 | 56 |
| 7 | 2.3718 | 0.675 | 1.0 | |
| GC { 8 | ∞ | 0.4 | 1.518249 | 64.1 |
| 9 | ∞ | 0.61445 | 1.0 | |

FIG. 12B

| | EXAMPLE 3, ASPHERIC DATA | | |
|---|---|---|---|
| ASPHERIC COEFFICIENT | SURFACE NO. | | |
| | SECOND SURFACE | THIRD SURFACE | FOURTH SURFACE |
| KA | 0.555297 | 1 | 1.44326 |
| $B_3$ | 2.10E-03 | -1.79E-02 | -1.01E-01 |
| $B_4$ | 2.64E-03 | 1.98E-01 | 2.08E-01 |
| $B_5$ | -4.55E-02 | -6.45E-01 | -2.18E-01 |
| $B_6$ | 1.16E-01 | 5.84E-01 | 3.01E-02 |
| $B_7$ | -1.03E-02 | 8.70E-01 | -2.03E-01 |
| $B_8$ | -9.34E-02 | -2.54E+00 | 3.37E-01 |
| $B_9$ | -2.93E-02 | 2.23E+00 | 4.18E-01 |
| $B_{10}$ | 7.23E-02 | -7.09E-01 | -4.66E-01 |
| | FIFTH SURFACE | SIXTH SURFACE | SEVENTH SURFACE |
| KA | -0.14001 | -43.8853 | -12.0627 |
| $B_3$ | -2.33E-01 | -1.28E-01 | 4.30E-03 |
| $B_4$ | 1.21E-01 | -7.65E-02 | -1.21E-01 |
| $B_5$ | 6.30E-02 | 4.56E-02 | 6.33E-02 |
| $B_6$ | -1.44E-01 | 2.49E-02 | 4.72E-03 |
| $B_7$ | -2.94E-02 | -4.74E-04 | -1.52E-02 |
| $B_8$ | 1.40E-01 | -7.86E-03 | -3.80E-04 |
| $B_9$ | 1.17E-01 | -2.52E-03 | 3.92E-03 |
| $B_{10}$ | -1.04E-01 | 2.34E-03 | -1.06E-03 |

FIG. 13A

| | EXAMPLE 4, BASIC LENS DATA | | | | |
|---|---|---|---|---|---|
| | Si (SURFACE NO.) | Ri (RADIUS OF CURVATURE) | Di (SURFACE TO SURFACE INTERVAL) | Ndi (REFRACTIVE INDEX) | vdj (ABBE NUMBER) |
| | 1 (STOP) | — | −0.11739 | 1.0 | |
| G1 | 2 | 1.5222 | 0.78867 | 1.51081 | 56 |
| | 3 | 7.4907 | 0.73413 | 1.0 | |
| G2 | 4 | −1.4069 | 0.6 | 1.533308 | 56 |
| | 5 | −1.418 | 0.34308 | 1.0 | |
| G3 | 6 | 17.8843 | 0.99493 | 1.51081 | 56 |
| | 7 | 2.8841 | 0.675 | 1.0 | |
| GC | 8 | ∞ | 0.4 | 1.518249 | 64.1 |
| | 9 | ∞ | 0.47719 | 1.0 | |

FIG. 13B

| | EXAMPLE 4, ASPHERIC DATA | | |
|---|---|---|---|
| ASPHERIC COEFFICIENT | SURFACE NO. | | |
| | SECOND SURFACE | THIRD SURFACE | FOURTH SURFACE |
| KA | 0.440781 | 1 | 1.466092 |
| $B_3$ | 2.00E−03 | −3.65E−02 | −9.60E−02 |
| $B_4$ | 2.84E−02 | 2.46E−01 | 2.54E−01 |
| $B_5$ | −7.40E−02 | −6.63E−01 | −3.11E−01 |
| $B_6$ | 1.04E−01 | 5.18E−01 | −9.33E−03 |
| $B_7$ | 2.76E−02 | 8.30E−01 | −9.47E−02 |
| $B_8$ | −8.17E−02 | −2.30E+00 | 4.39E−01 |
| $B_9$ | −1.55E−02 | 2.08E+00 | 4.60E−01 |
| $B_{10}$ | 3.32E−02 | −7.26E−01 | −6.45E−01 |
| | FIFTH SURFACE | SIXTH SURFACE | SEVENTH SURFACE |
| KA | −1.51121 | −34.5473 | 0.386599 |
| $B_3$ | −1.44E−01 | −1.55E−01 | −9.19E−02 |
| $B_4$ | 8.55E−02 | 1.75E−03 | −6.13E−02 |
| $B_5$ | 1.74E−02 | 2.41E−02 | 4.25E−02 |
| $B_6$ | −1.41E−01 | 4.09E−03 | 3.62E−04 |
| $B_7$ | −5.89E−03 | −3.32E−03 | −1.26E−02 |
| $B_8$ | 1.59E−01 | −2.07E−03 | 2.77E−04 |
| $B_9$ | 1.16E−01 | 1.13E−03 | 3.87E−03 |
| $B_{10}$ | −1.14E−01 | 4.22E−04 | −1.16E−03 |

FIG. 14A

| | EXAMPLE 5, BASIC LENS DATA | | | |
|---|---|---|---|---|
| Si (SURFACE NO.) | Ri (RADIUS OF CURVATURE) | Di (SURFACE TO SURFACE INTERVAL) | Ndi (REFRACTIVE INDEX) | vdj (ABBE NUMBER) |
| 1 (STOP) | — | -0.05 | | |
| 2 | 1.1936 | 0.66856 | 1.533308 | 56 |
| 3 | 7.2073 | 0.57 | 1.0 | |
| 4 | -1.228 | 0.46875 | 1.609211 | 27 |
| 5 | -1.3905 | 0.04226 | 1.0 | |
| 6 | 1.6502 | 0.58623 | 1.533308 | 56 |
| 7 | 1.04 | 0.4375 | 1.0 | |
| 8 | ∞ | 0.3 | 1.518249 | 64.1 |
| 9 | ∞ | 0.38418 | | |

| ASPHERIC COEFFICIENT | SURFACE NO. | | |
|---|---|---|---|
| | EXAMPLE 5, ASPHERIC DATA | | |
| | SECOND SURFACE | THIRD SURFACE | FOURTH SURFACE |
| KA | 1.129188 | 1 | 0.957444 |
| $B_3$ | -3.95E-02 | -7.38E-02 | 7.36E-02 |
| $B_4$ | 3.49E-01 | 6.15E-01 | -2.13E-01 |
| $B_5$ | -1.39E+00 | -2.78E+00 | 1.31E+00 |
| $B_6$ | 1.19E+00 | 3.91E+00 | -7.74E-02 |
| $B_7$ | 9.53E-01 | 1.09E+01 | -6.37E+00 |
| $B_8$ | 1.24E+00 | -5.22E+01 | 9.87E-01 |
| $B_9$ | -1.12E+00 | 7.35E+01 | 1.81E+01 |
| $B_{10}$ | -3.90E+00 | -3.49E+01 | -1.63E+01 |
| | FIFTH SURFACE | SIXTH SURFACE | SEVENTH SURFACE |
| KA | -0.36538 | -2.08083 | 0.295281 |
| $B_3$ | 4.21E-02 | -7.04E-02 | -5.34E-02 |
| $B_4$ | -3.19E-01 | -4.67E-01 | -7.92E-01 |
| $B_5$ | 1.11E+00 | 1.17E-02 | 4.27E-01 |
| $B_6$ | -5.29E-01 | 2.53E-01 | 2.22E-01 |
| $B_7$ | -1.70E+00 | 2.17E-01 | -1.54E-01 |
| $B_8$ | 1.32E+00 | -1.07E-01 | -1.67E-01 |
| $B_9$ | 2.03E+00 | -1.40E-01 | 1.47E-01 |
| $B_{10}$ | -1.75E+00 | 6.11E-02 | -3.08E-02 |

FIG. 15A

| EXAMPLE 6, BASIC LENS DATA | | | | |
|---|---|---|---|---|
| Si (SURFACE NO.) | Ri (RADIUS OF CURVATURE) | Di (SURFACE TO SURFACE INTERVAL) | Ndi (REFRACTIVE INDEX) | vdj (ABBE NUMBER) |
| 1 (STOP) | — | −0.05 | 1.0 | |
| G1 { 2 | 1.2222 | 0.7232 | 1.533308 | 56 |
| 3 | 5.9583 | 0.64198 | 1.0 | |
| G2 { 4 | −2.0643 | 0.46875 | 1.609211 | 27 |
| 5 | −2.1733 | 0.08 | 1.0 | |
| G3 { 6 | 1.6288 | 0.52831 | 1.533308 | 56 |
| 7 | 1.0042 | 0.4375 | 1.0 | |
| GC { 8 | ∞ | 0.3 | 1.518249 | 64.1 |
| 9 | ∞ | 0.27537 | 1.0 | |

FIG. 15B

| EXAMPLE 6, ASPHERIC DATA | | | |
|---|---|---|---|
| ASPHERIC COEFFICIENT | SURFACE NO. | | |
| | SECOND SURFACE | THIRD SURFACE | FOURTH SURFACE |
| KA | 1.456645 | 1 | 3.557637 |
| $B_3$ | −6.33E−02 | −7.55E−02 | 7.35E−02 |
| $B_4$ | 4.56E−01 | 6.00E−01 | −7.07E−01 |
| $B_5$ | −1.52E+00 | −2.59E+00 | 2.52E+00 |
| $B_6$ | 8.84E−01 | 3.66E+00 | −5.63E−01 |
| $B_7$ | 9.41E−01 | 1.09E+01 | −7.54E+00 |
| $B_8$ | 2.00E+00 | −5.17E+01 | 8.79E−01 |
| $B_9$ | 1.94E+00 | 7.35E+01 | 1.93E+01 |
| $B_{10}$ | −9.74E+00 | −3.57E+01 | −1.59E+01 |
| | FIFTH SURFACE | SIXTH SURFACE | SEVENTH SURFACE |
| KA | 0.322738 | −1.68196 | 0.262743 |
| $B_3$ | −2.63E−02 | −7.30E−02 | 2.05E−02 |
| $B_4$ | −2.72E−01 | −4.96E−01 | −9.47E−01 |
| $B_5$ | 1.05E+00 | −1.70E−02 | 4.64E−01 |
| $B_6$ | −3.61E−01 | 2.24E−01 | 2.78E−01 |
| $B_7$ | −1.78E+00 | 2.33E−01 | −1.54E−01 |
| $B_8$ | 9.57E−01 | −7.62E−02 | −1.86E−01 |
| $B_9$ | 1.75E+00 | −1.23E−01 | 1.41E−01 |
| $B_{10}$ | −1.24E+00 | 4.12E−02 | −2.50E−02 |

FIG. 16A

| | | EXAMPLE 7, BASIC LENS DATA | | | |
|---|---|---|---|---|---|
| | Si (SURFACE NO.) | Ri (RADIUS OF CURVATURE) | Di (SURFACE TO SURFACE INTERVAL) | Ndi (REFRACTIVE INDEX) | vdj (ABBE NUMBER) |
| | 1 (STOP) | — | -0.05 | 1.0 | |
| G1 { | 2 | 1.1126 | 0.68553 | 1.533308 | 56 |
| | 3 | 4.9897 | 0.50251 | 1.0 | |
| G2 { | 4 | -1.2715 | 0.46875 | 1.609211 | 27 |
| | 5 | -5.1981 | 0.05469 | 1.0 | |
| G3 { | 6 | 0.9254 | 0.66684 | 1.533308 | 56 |
| | 7 | 1.1756 | 0.4375 | 1.0 | |
| GC { | 8 | ∞ | 0.3 | 1.518249 | 64.1 |
| | 9 | ∞ | 0.33105 | 1.0 | |

FIG. 16B

| | EXAMPLE 7, ASPHERIC DATA | | |
|---|---|---|---|
| ASPHERIC COEFFICIENT | SURFACE NO. | | |
| | SECOND SURFACE | THIRD SURFACE | FOURTH SURFACE |
| KA | 1.607037 | 1 | 1.126334 |
| $B_3$ | -7.41E-02 | -7.67E-02 | 6.97E-02 |
| $B_4$ | 4.39E-01 | 6.69E-01 | -1.85E-01 |
| $B_5$ | -1.39E+00 | -2.94E+00 | 1.01E+00 |
| $B_6$ | 9.47E-01 | 4.27E+00 | -1.60E-01 |
| $B_7$ | 6.70E-01 | 1.13E+01 | -5.98E+00 |
| $B_8$ | 1.19E+00 | -5.26E+01 | 1.78E+00 |
| $B_9$ | -1.26E+00 | 7.25E+01 | 1.89E+01 |
| $B_{10}$ | -2.40E+00 | -3.39E+01 | -1.83E+01 |
| | FIFTH SURFACE | SIXTH SURFACE | SEVENTH SURFACE |
| KA | -2220.5 | -0.74174 | 0.016236 |
| $B_3$ | -7.17E-01 | -6.52E-01 | 7.38E-01 |
| $B_4$ | -4.80E-03 | -2.40E-01 | -8.06E-01 |
| $B_5$ | 1.33E+00 | 1.98E-01 | 4.47E-01 |
| $B_6$ | -6.64E-01 | 3.13E-01 | 2.11E-01 |
| $B_7$ | -1.76E+00 | 1.77E-01 | -1.56E-01 |
| $B_8$ | 1.53E+00 | -1.78E-01 | -1.52E-01 |
| $B_9$ | 2.30E+00 | -1.91E-01 | 1.49E-01 |
| $B_{10}$ | -2.14E+00 | 1.12E-01 | -3.61E-02 |

FIG. 17A

| | EXAMPLE 8, BASIC LENS DATA | | | | |
|---|---|---|---|---|---|
| | Si (SURFACE NO.) | Ri (RADIUS OF CURVATURE) | Di (SURFACE TO SURFACE INTERVAL) | Ndi (REFRACTIVE INDEX) | νdj (ABBE NUMBER) |
| | 1 (STOP) | — | -0.05 | 1.0 | |
| G1 | 2 | 1.1214 | 0.53431 | 1.533308 | 56 |
| | 3 | 9.1995 | 0.51331 | 1.0 | |
| G2 | 4 | -1.1726 | 0.46875 | 1.609211 | 27 |
| (A) | 5 | -6.0309 | 0.13256 | 1.0 | |
| G3 | 6 | 0.8329 | 0.62846 | 1.51081 | 56 |
| | 7 | 1.0646 | 0.4375 | 1.0 | |
| GC | 8 | ∞ | 0.3 | 1.518249 | 64.1 |
| | 9 | ∞ | 0.38477 | 1.0 | |

FIG. 17B

| | EXAMPLE 8, ASPHERIC DATA | | |
|---|---|---|---|
| ASPHERIC COEFFICIENT | SURFACE NO. | | |
| | SECOND SURFACE | THIRD SURFACE | FOURTH SURFACE |
| KA | 1.222325 | 1 | 2.077617 |
| $B_3$ | -6.08E-02 | -8.29E-02 | -4.24E-02 |
| $B_4$ | 3.48E-01 | 5.85E-01 | -1.09E-01 |
| $B_5$ | -1.15E+00 | -3.02E+00 | 8.12E-01 |
| $B_6$ | 1.12E+00 | 4.33E+00 | -2.59E-01 |
| $B_7$ | 1.90E-01 | 1.13E+01 | -5.28E+00 |
| $B_8$ | -2.66E-01 | -5.30E+01 | 3.55E+00 |
| $B_9$ | -2.55E+00 | 7.18E+01 | 2.00E+01 |
| $B_{10}$ | 2.77E+00 | -3.42E+01 | -2.47E+01 |
| | FIFTH SURFACE | SIXTH SURFACE | SEVENTH SURFACE |
| KA | -5172.29 | -1.87958 | 0.298145 |
| $B_3$ | -7.75E-01 | -6.71E-01 | -1.22E-01 |
| $B_4$ | -5.98E-02 | -1.84E-01 | -7.28E-01 |
| $B_5$ | 1.33E+00 | 2.40E-01 | 4.20E-01 |
| $B_6$ | -5.68E-01 | 3.26E-01 | 1.94E-01 |
| $B_7$ | -1.57E+00 | 1.55E-01 | -1.57E-01 |
| $B_8$ | 1.73E+00 | -2.06E-01 | -1.47E-01 |
| $B_9$ | 2.34E+00 | -2.05E-01 | 1.51E-01 |
| $B_{10}$ | -2.56E+00 | 1.33E-01 | -3.81E-02 |

FIG. 18A

| | EXAMPLE 9, BASIC LENS DATA | | | | |
|---|---|---|---|---|---|
| | $S_i$ (SURFACE NO.) | $R_i$ (RADIUS OF CURVATURE) | $D_i$ (SURFACE TO SURFACE INTERVAL) | $N_{di}$ (REFRACTIVE INDEX) | $\nu_{dj}$ (ABBE NUMBER) |
| | 1 (STOP) | — | -0.05 | 1.0 | |
| G1 { | 2 | 1.1282 | 0.67503 | 1.533308 | 56 |
| | 3 | 4.825 | 0.51511 | 1.0 | |
| G2 { | 4 | -1.2525 | 0.46875 | 1.609211 | 27 |
| | 5 | -1.5879 | 0.04297 | 1.0 | |
| G3 { | 6 | 1.5477 | 0.62841 | 1.533308 | 56 |
| | 7 | 1.13 | 0.4375 | 1.0 | |
| GC { | 8 | ∞ | 0.3 | 1.518249 | 64.1 |
| | 9 | ∞ | 0.38377 | 1.0 | |

FIG. 18B

| EXAMPLE 9, ASPHERIC DATA | | | |
|---|---|---|---|
| ASPHERIC COEFFICIENT | SURFACE NO. | | |
| | SECOND SURFACE | THIRD SURFACE | FOURTH SURFACE |
| KA | 1.220073 | 1 | 0.756988 |
| $B_3$ | -4.29E-02 | -7.76E-02 | 7.37E-02 |
| $B_4$ | 3.63E-01 | 6.80E-01 | -1.23E-01 |
| $B_5$ | -1.35E+00 | -2.82E+00 | 1.15E+00 |
| $B_6$ | 1.21E+00 | 3.94E+00 | -1.53E-01 |
| $B_7$ | 8.25E-01 | 1.10E+01 | -6.23E+00 |
| $B_8$ | 8.55E-01 | -5.20E+01 | 1.32E+00 |
| $B_9$ | -1.68E+00 | 7.36E+01 | 1.83E+01 |
| $B_{10}$ | -2.21E+00 | -3.55E+01 | -1.69E+01 |
| | FIFTH SURFACE | SIXTH SURFACE | SEVENTH SURFACE |
| KA | 0.669279 | -4.96242 | 0.353701 |
| $B_3$ | 4.16E-02 | -6.74E-02 | -8.07E-03 |
| $B_4$ | -3.77E-01 | -4.60E-01 | -8.13E-01 |
| $B_5$ | 1.14E+00 | 2.20E-02 | 4.31E-01 |
| $B_6$ | -5.07E-01 | 2.64E-01 | 2.20E-01 |
| $B_7$ | -1.65E+00 | 2.19E-01 | -1.55E-01 |
| $B_8$ | 1.39E+00 | -1.09E-01 | -1.65E-01 |
| $B_9$ | 2.06E+00 | -1.44E-01 | 1.47E-01 |
| $B_{10}$ | -1.88E+00 | 6.07E-02 | -3.19E-02 |

FIG. 19

VALUES RELATED TO CONDITIONAL EXPRESSIONS

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| f | 4.39 | 4.40 | 4.41 | 4.37 | 2.93 | 2.98 | 2.92 | 2.91 | 2.94 |
| f1 | 3.74 | 4.23 | 3.74 | 3.58 | 2.57 | 2.73 | 2.53 | 2.34 | 2.54 |
| f2 | −35.04 | 8.85 | −25.85 | 18.93 | −27.40 | 107.70 | −2.90 | −2.40 | −20.00 |
| f3 | −25.06 | −5.42 | −29.84 | −6.88 | −12.80 | −6.95 | 4.20 | 3.90 | −16.00 |
| f1/f | 0.85 | 0.96 | 0.85 | 0.82 | 0.88 | 0.92 | 0.87 | 0.80 | 0.86 |
| f2/{f3·(45−νd2)} | −0.13 | 0.15 | −0.08 | 0.25 | 0.12 | −0.86 | −0.04 | −0.03 | 0.07 |
| νd1 | 56 | 56 | 56 | 56 | 56 | 56 | 56 | 56 | 56 |
| νd2 | 56 | 56 | 56 | 56 | 27 | 27 | 27 | 27 | 27 |
| νd3 | 56 | 56 | 56 | 56 | 56 | 56 | 56 | 56 | 56 |

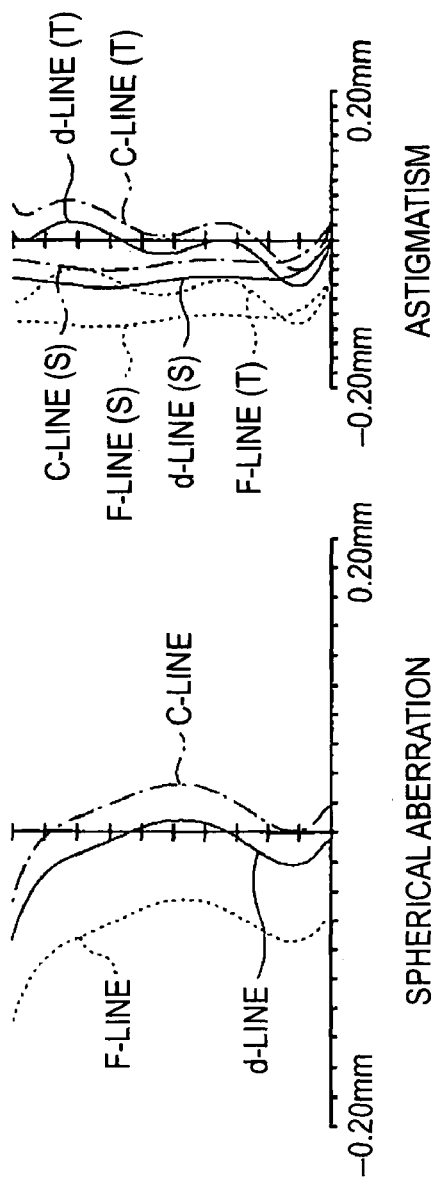
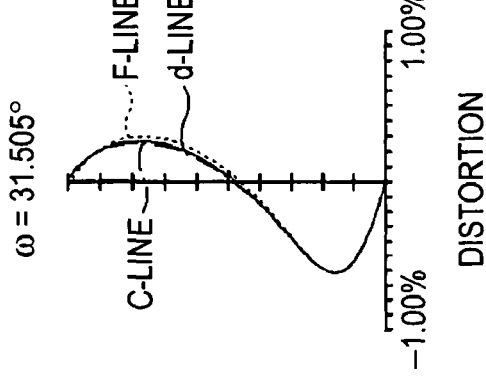
EXAMPLE 1
FIG. 20A SPHERICAL ABERRATION
FIG. 20B ASTIGMATISM
FIG. 20C DISTORTION

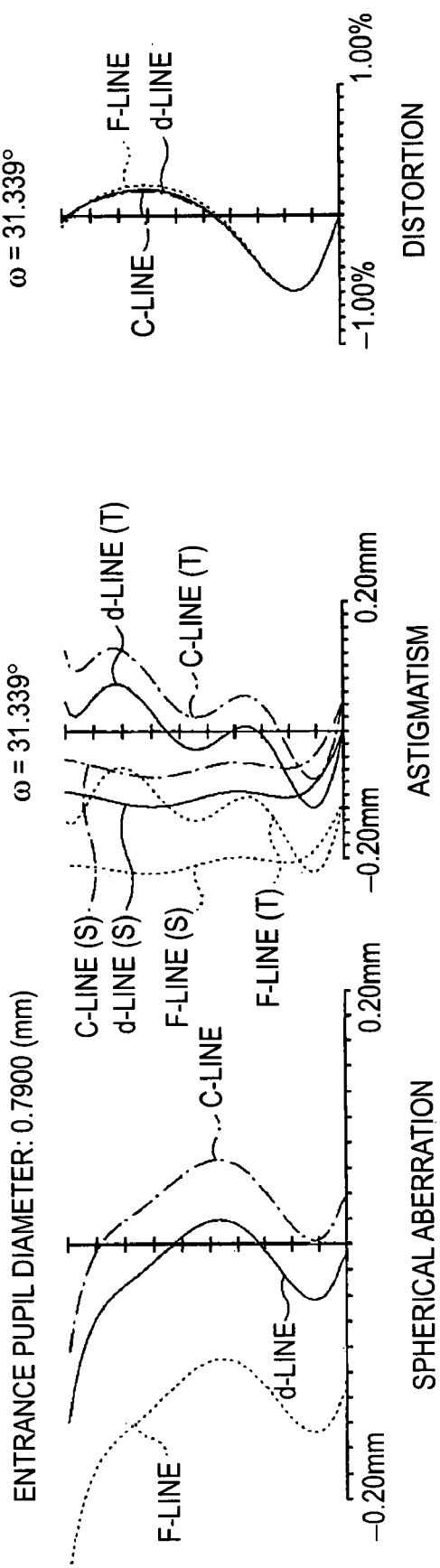

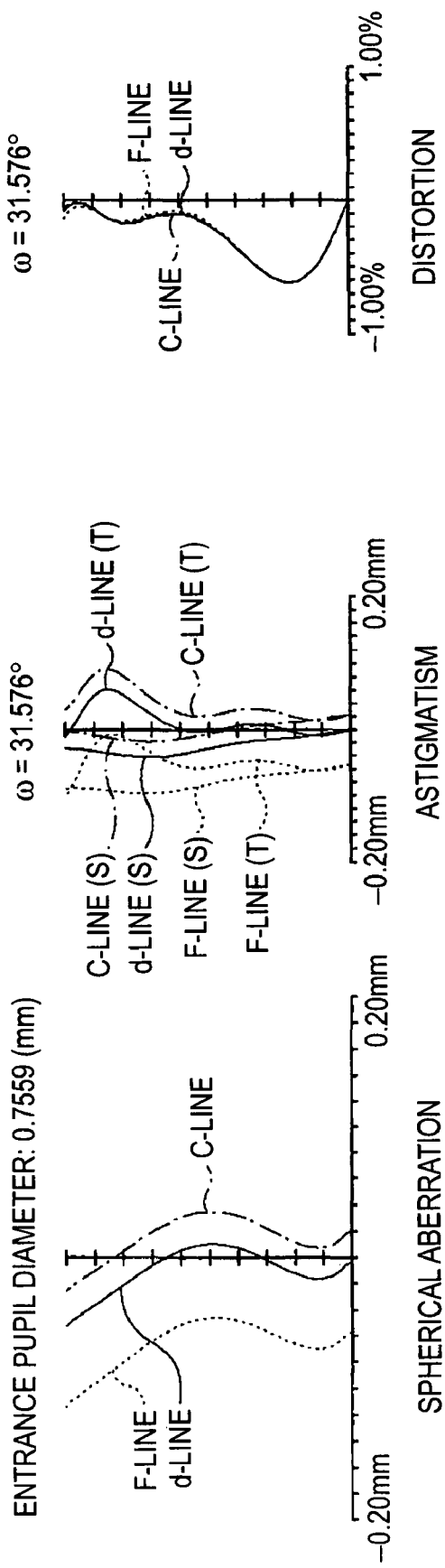

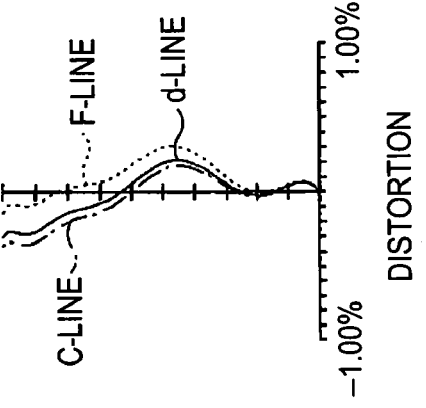
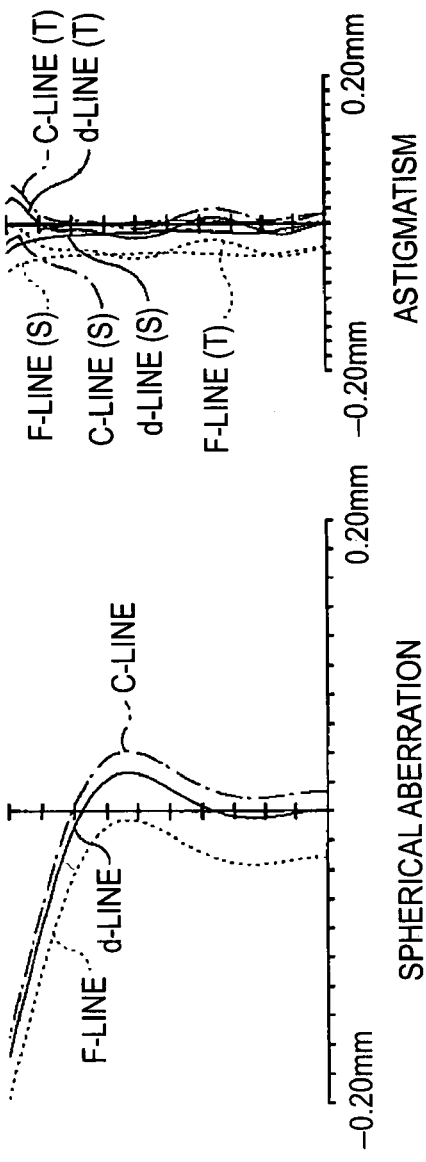
FIG. 24C
FIG. 24B
FIG. 24A

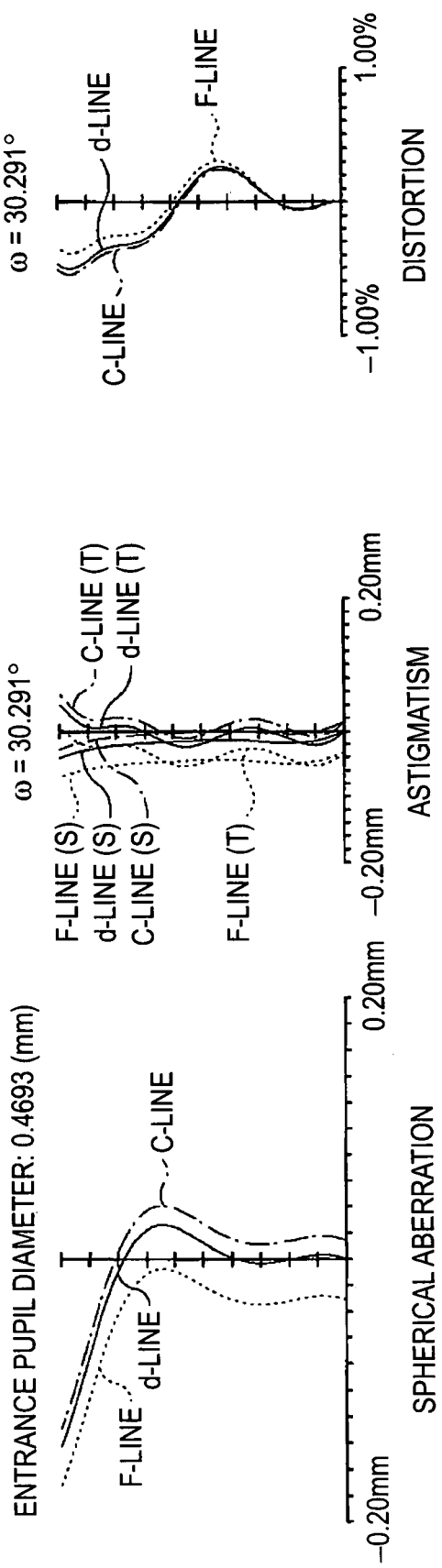

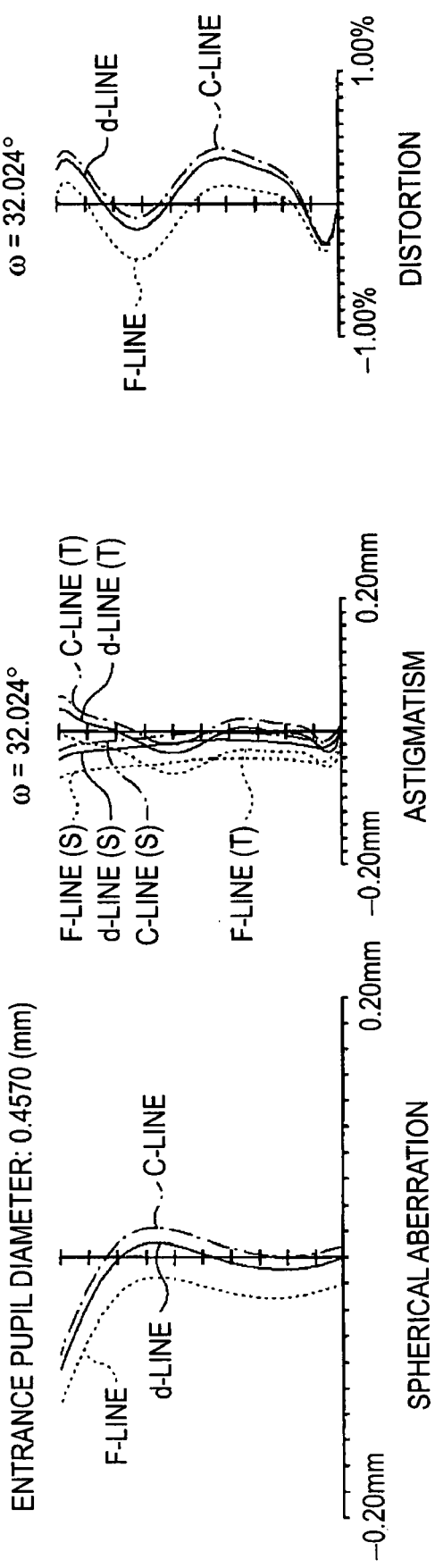

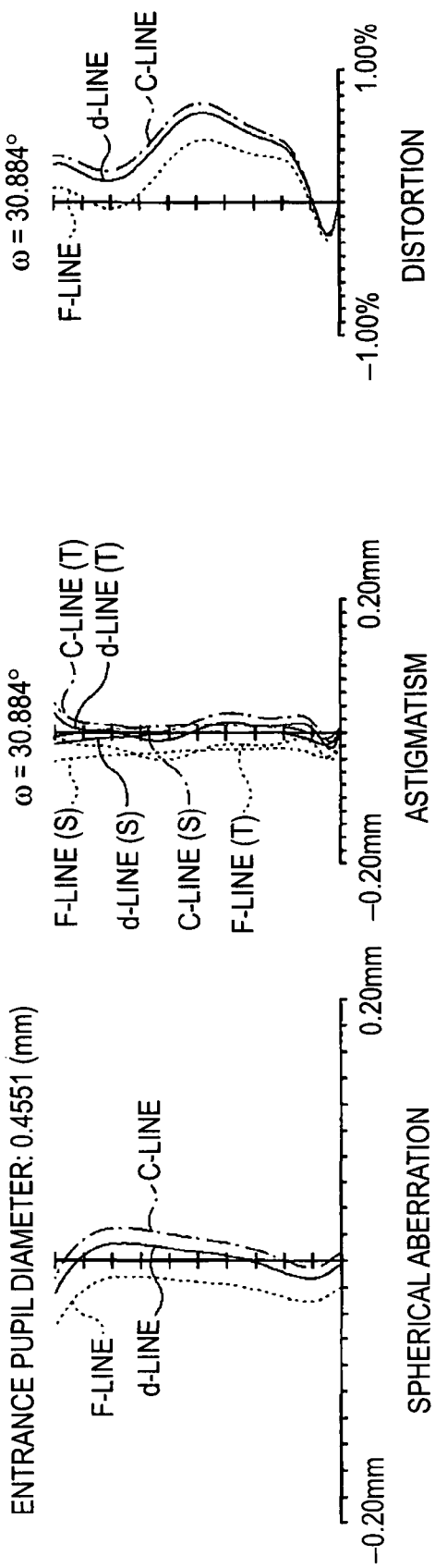

IMAGING LENS

BACKGROUND OF THE INVENTION

1. Field of the Invention

The present invention relates to an imaging lens to be mounted on an imaging apparatus using an imaging device, such as a CCD (charge coupled device) or a CMOS (complementary metal oxide semiconductor).

2. Description of the Related Art

Recently, size reduction and pixel-density increase have advanced conspicuously for the imaging apparatuses, such as of CCDs and MOSs. This in turn requires an imager proper and a lens for mount thereon, that are smaller in size but higher in performance. Meanwhile, in order to cope with the imaging device having pixels with density, there is also a need to provide a telecentricity, i.e. characteristic to place the main rays of light incident upon the imaging device at an angle nearly parallel with the optical axis (incident angle upon the image plane nearly zero relative to the normal line to the image plane). Conventionally, there is known an imaging lens, in a three-lens arrangement, to be mounted on a camera-equipped cellular phone or the like. JP-A-2003-322792 describes an imaging lens having so-called an inter-stop structure formed by totally three lenses and arranged with an aperture stop between the first lens and the second lens. However, with an inter-stop structure, if attempted to reduce the total length of the lens system, the angle is increased of the main rays of light upon the image plane, thus resulting in a worse telecentricity. For this reason, it can be considered to arrange the aperture stop in a position closest to the object in order to ensure the telecentricity. JP-A-2004-219807, JP-A-2004-240063 and JP-A-2004-317743 describe image lenses each having a three-lens structure whose aperture stop is arranged closest to the object. In the three-lens-structured imaging lens arranged with an aperture stop closest to the object, the first lens frequently is made convex at its surface closer to the image surface, particularly made convex at both surfaces.

However, in the case of arranging the three-lens-structured imaging lens with an aperture stop in a position closest to the object, it is advantageous to reduce the total length and secure the telecentricity. Nevertheless, the sensitivity in manufacture is raised to readily cause variations on the image surface in the case there is a lens positional deviation in the manufacture. Particularly, where the first lens is convex in form at both surfaces, the sensitivity-in-manufacture is ready to rise. Meanwhile, recently, a development is desired of an imaging lens well relieved of chromatic aberration, in order to cope with increasing pixel density.

SUMMARY OF THE INVENTION

The present invention has been made in view of the foregoing problem, and it is an object thereof to provide an imaging lens capable of realizing a lens system smaller in size but higher in performance correspondingly to increasing pixel density.

An imaging lens according to the invention comprises, in order from an object side: an aperture stop; a first lens having a positive refractive power in a meniscus form having a convex surface facing toward the object; a second lens having a positive or negative refractive power in a meniscus form having a concave surface facing toward the object; and a third lens having a positive or negative refractive power in an aspheric form at both surfaces;

wherein conditional expressions given below are satisfied:

$$vd1 > 50 \quad (1)$$

$$vd3 > 50 \quad (2)$$

$$0.7 < f1/f < 1.0 \quad (3)$$

$$-0.9 < f2/\{f3 \cdot (45 - vd2)\} < 0.4 \quad (4)$$

where
vd1: Abbe number of the first lens,
vd2: Abbe number of the second lens,
vd3: Abbe number of the third lens,
f: focal length of an overall system,
f1: focal length of the first lens,
f2: focal length of the second lens, and
f3: focal length of the third lens.

In the imaging lens according to the invention, by providing an arrangement of as less as totally three lenses and arranging the aperture stop in a position closest to the object, a lens system can be obtained which is advantageous in reducing the total length and securing a telecentricity. Furthermore, by satisfying the conditional expressions, optimization is achieved for the material of and the power distribution over the lenses, thus obtaining a lens system small in size but high in performance in a manner compatible with pixel-density increase. Particularly, by making the first lens in a positive meniscus form whose convex surface faces toward the object and properly controlling the power of the second and third lenses and the dispersion at the second lens according to the conditional expression (4), the chromatic aberration is relieved while the variation on the image surface due to positional deviation caused upon manufacture is relieved, thus obtaining a lens system excellent in manufacture aptitude.

In the imaging lens of the invention, the second lens and the third lens are preferably plastic lenses. The second and third lenses preferably employ aspheric lenses in order to correct for aberrations by means of the lens arrangement having as less as three lenses. In such a case, the plastic lens is advantageous in forming aspheric lenses.

Meanwhile, in the imaging lens of the invention, the third lens preferably has a surface closer to an image formed concave in form at and around an optical axis and convex in form at a periphery thereof. This particularly provides advantage in correcting for curvature of field and securing a telecentricity.

BRIEF DESCRIPTION OF THE DRAWINGS

FIGS. 10A and 10B are figures showing the lens data of an imaging lens according to example 1 of the invention, wherein FIG. 10A shows the basic lens data and FIG. 10B shows the lens data concerning an aspheric surface;

FIGS. 11A and 11B are figures showing the lens data of an imaging lens according to example 2 of the invention, wherein FIG. 11A shows the basic lens data and FIG. 11B shows the lens data concerning an aspheric surface;

FIGS. 12A and 12B are figures showing the lens data of an imaging lens according to example 3 of the invention, wherein FIG. 12A shows the basic lens data and FIG. 12B shows the lens data concerning an aspheric surface;

FIGS. 13A and 13B are figures showing the lens data of an imaging lens according to example 4 of the invention, wherein FIG. 13A shows the basic lens data and FIG. 13B shows the lens data concerning an aspheric surface;

FIGS. 14A and 14B are figures showing the lens data of an imaging lens according to example 5 of the invention, wherein FIG. 14A shows the basic lens data and FIG. 14B shows the lens data concerning an aspheric surface;

FIGS. 15A and 15B are figures showing the lens data of an imaging lens according to example 6 of the invention, wherein FIG. 15A shows the basic lens data and FIG. 15B shows the lens data concerning an aspheric surface;

FIGS. 16A and 16B are figures showing the lens data of an imaging lens according to example 7 of the invention, wherein FIG. 16A shows the basic lens data and FIG. 16B shows the lens data concerning an aspheric surface;

FIGS. 17A and 17B are figures showing the lens data of an imaging lens according to example 8 of the invention, wherein FIG. 17A shows the basic lens data and FIG. 17B shows the lens data concerning an aspheric surface;

FIGS. 18A and 18B are figures showing the lens data of an imaging lens according to example 9 of the invention, wherein FIG. 18A shows the basic lens data and FIG. 18B shows the lens data concerning an aspheric surface;

FIG. 19 is a figure showing, collectively on each example, the values concerning the conditional expressions;

FIGS. 20A to 20C are aberration diagrams showing the aberrations of the imaging lens according to example 1 of the invention, wherein FIG. 20A shows a spherical aberration, FIG. 20B shows an astigmatism and FIG. 20C shows a distortion;

FIGS. 21A to 21C are aberration diagrams showing the aberrations of the imaging lens according to example 2 of the invention, wherein FIG. 21A shows a spherical aberration, FIG. 21B shows an astigmatism and FIG. 21C shows a distortion;

FIGS. 22A to 22C are aberration diagrams showing the aberrations of the imaging lens according to example 3 of the invention, wherein FIG. 22A shows a spherical aberration, FIG. 22B shows an astigmatism and FIG. 22C shows a distortion;

FIGS. 23A to 23C are aberration diagrams showing the aberrations of the imaging lens according to example 4 of the invention, wherein FIG. 23A shows a spherical aberration, FIG. 23B shows an astigmatism and FIG. 23C shows a distortion;

FIGS. 24A to 24C are aberration diagrams showing the aberrations of the imaging lens according to example 5 of the invention, wherein FIG. 24A shows a spherical aberration, FIG. 24B shows an astigmatism and FIG. 24C shows a distortion;

FIGS. 25A to 25C are aberration diagrams showing the aberrations of the imaging lens according to example 6 of the invention, wherein FIG. 25A shows a spherical aberration, FIG. 25B shows an astigmatism and FIG. 25C shows a distortion;

FIGS. 26A to 26C are aberration diagrams showing the aberrations of the imaging lens according to example 7 of the invention, wherein FIG. 26A shows a spherical aberration, FIG. 26B shows an astigmatism and FIG. 26C shows a distortion;

FIGS. 27A to 27C are aberration diagrams showing the aberrations of the imaging lens according to example 8 of the invention, wherein FIG. 27A shows a spherical aberration, FIG. 27B shows an astigmatism and FIG. 27C shows a distortion; and FIGS. 28A to 28C are aberration diagrams showing the aberrations of the imaging lens according to example 9 of the invention, wherein FIG. 28A shows a spherical aberration, FIG. 28B shows an astigmatism and FIG. 28C shows a distortion.

DETAILED DESCRIPTION OF THE INVENTION

With reference to the drawings, an embodiment of the present invention will now be explained.

Figure 1:
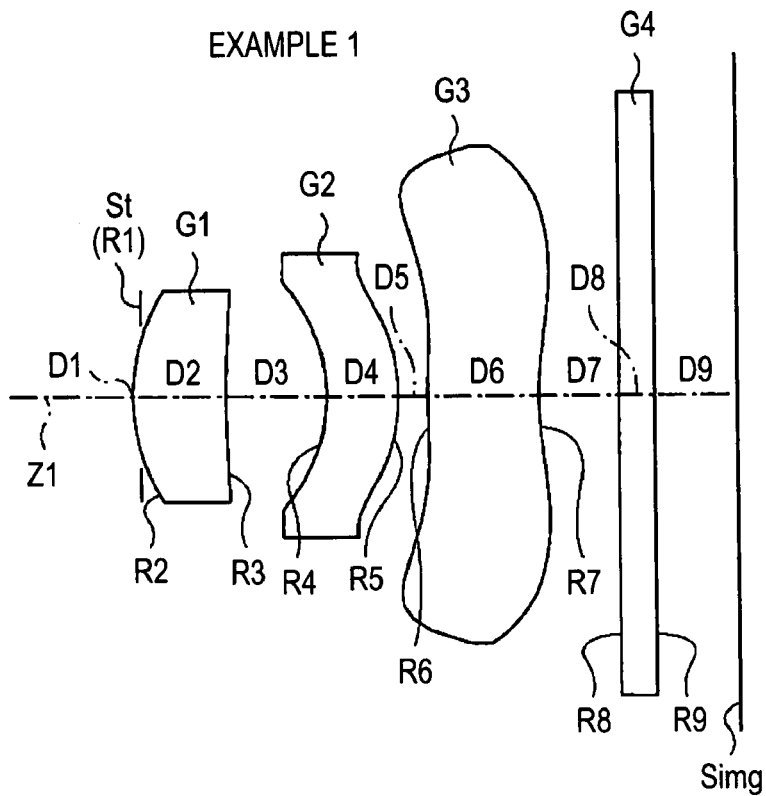
FIG. 1 is a lens sectional view corresponding to an imaging lens according to example 1 of the present invention.
Figure 2:
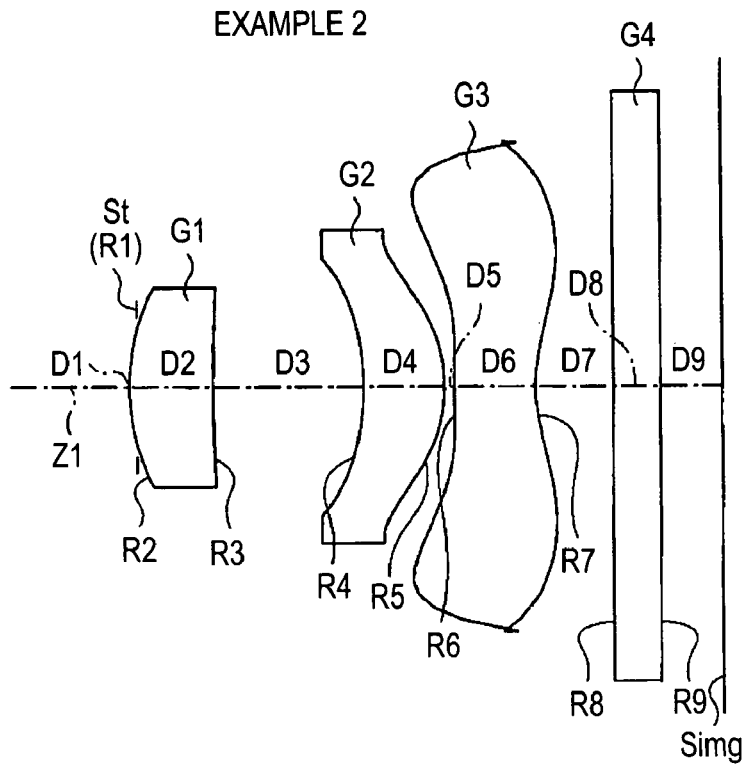
FIG. 2 is a lens sectional view corresponding to an imaging lens according to example 2 of the invention.
Figure 3:
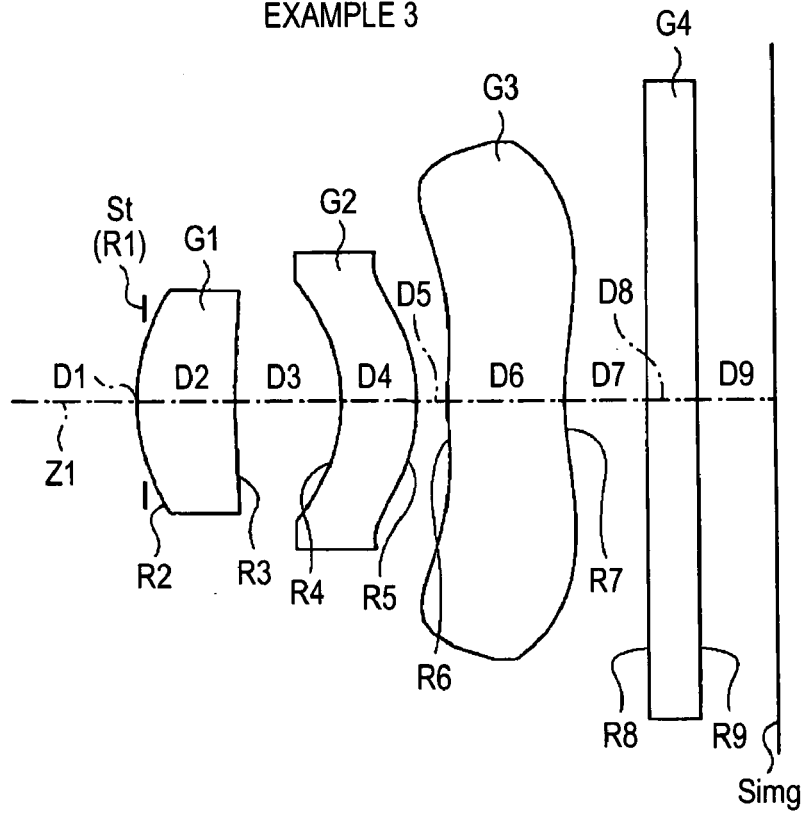
FIG. 3 is a lens sectional view corresponding to an imaging lens according to example 3 of the invention.
Figure 4:
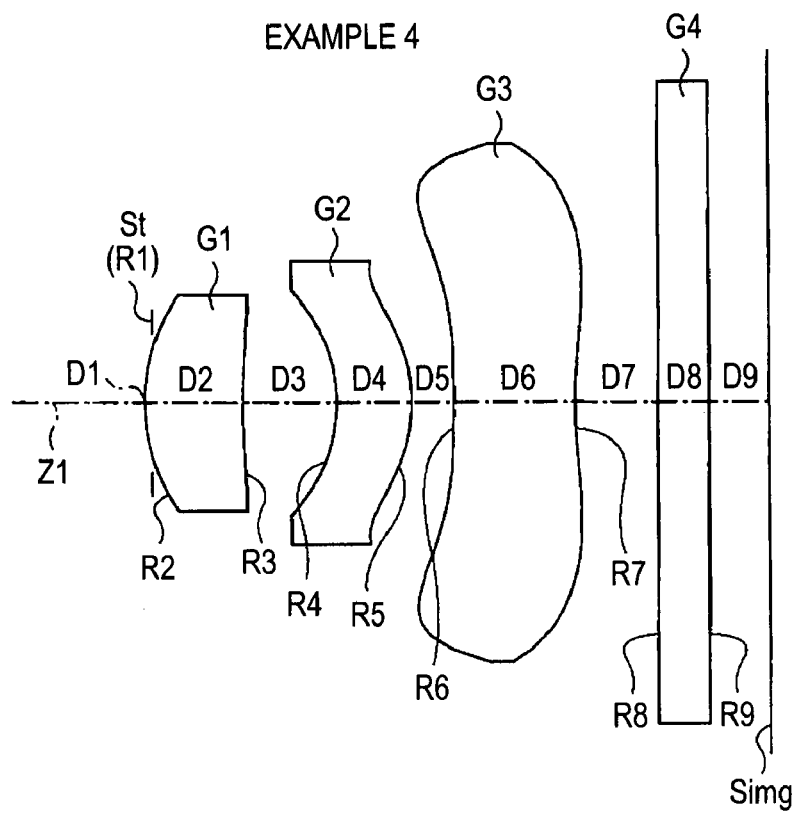
FIG. 4 is a lens sectional view corresponding to an imaging lens according to example 4 of the invention.
Figure 5:
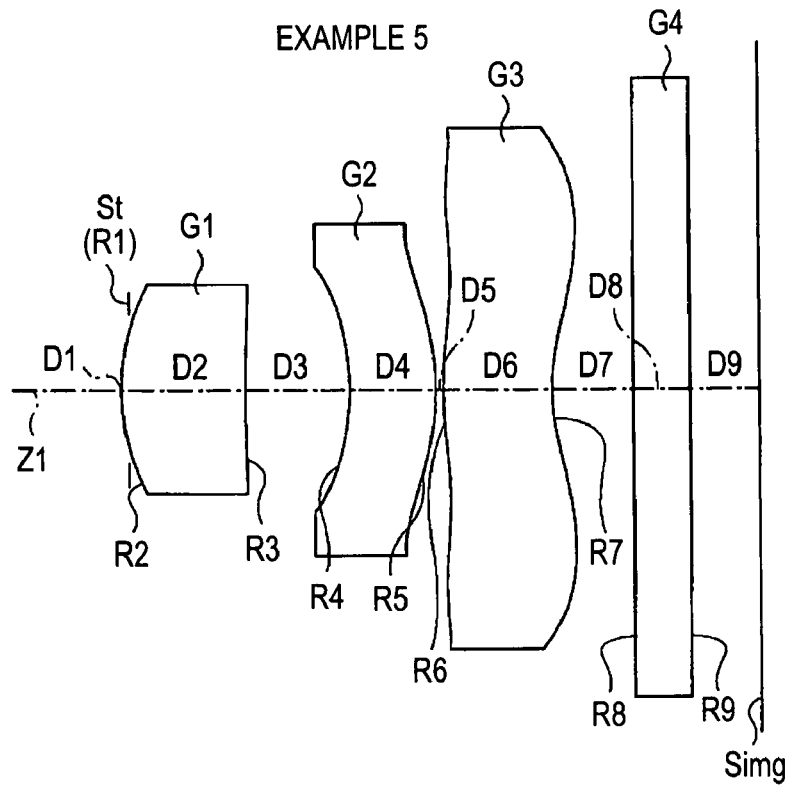
FIG. 5 is a lens sectional view corresponding to an imaging lens according to example 5 of the invention.
Figure 6:
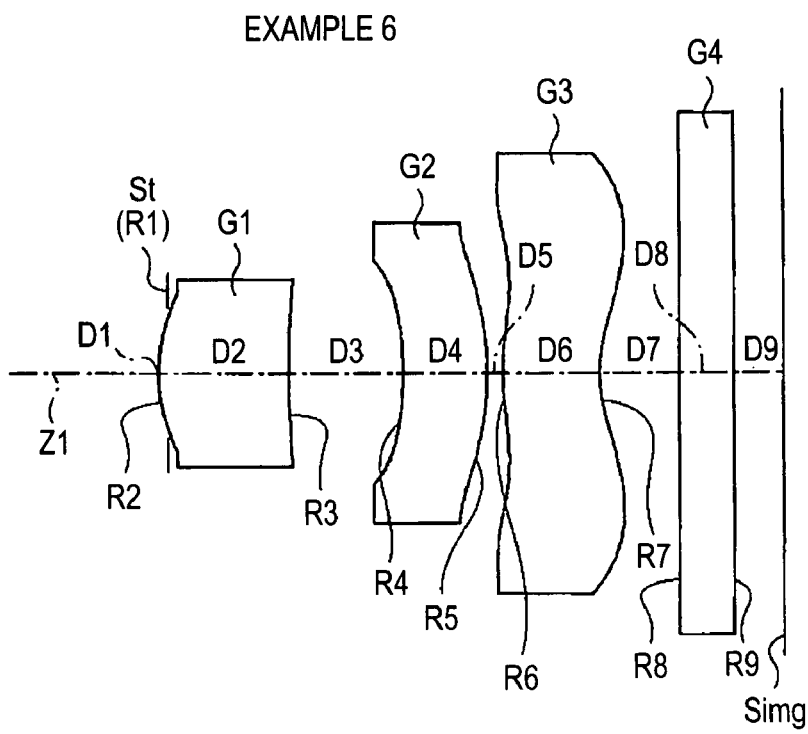
FIG. 6 is a lens sectional view corresponding to an imaging lens according to example 6 of the invention.
Figure 7:
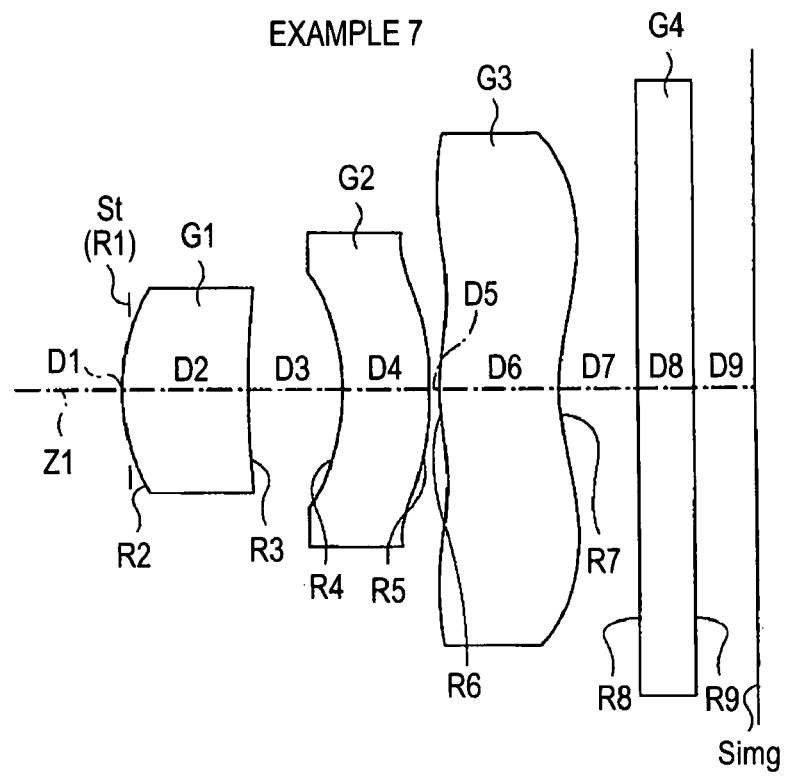
FIG. 7 is a lens sectional view corresponding to an imaging lens according to example 7 of the invention.
Figure 8:
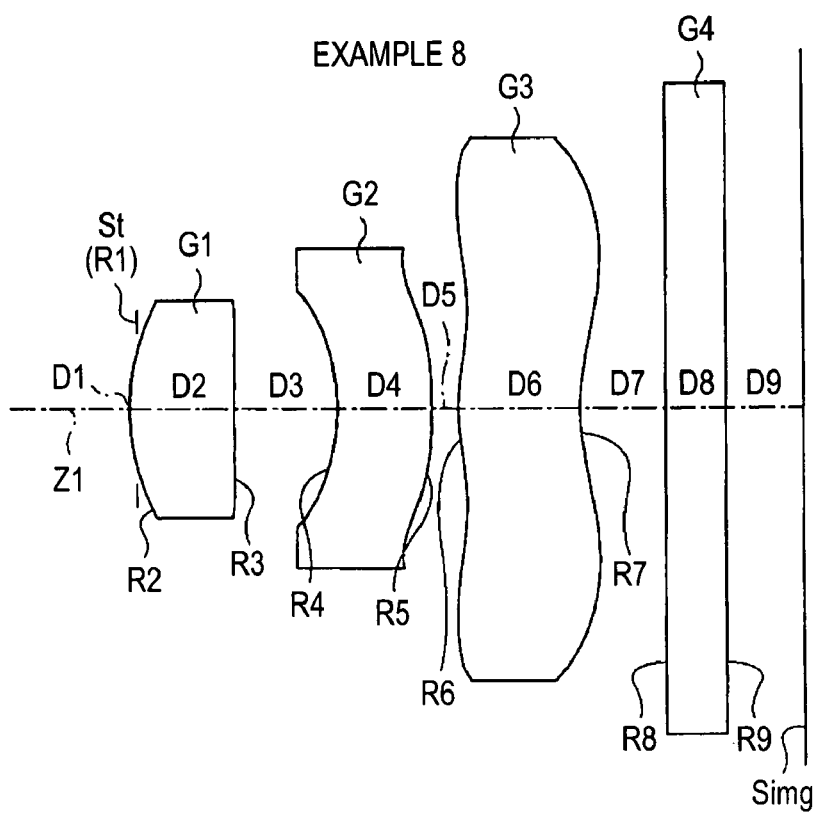
FIG. 8 is a lens sectional view corresponding to an imaging lens according to example 8 of the invention.
Figure 9:
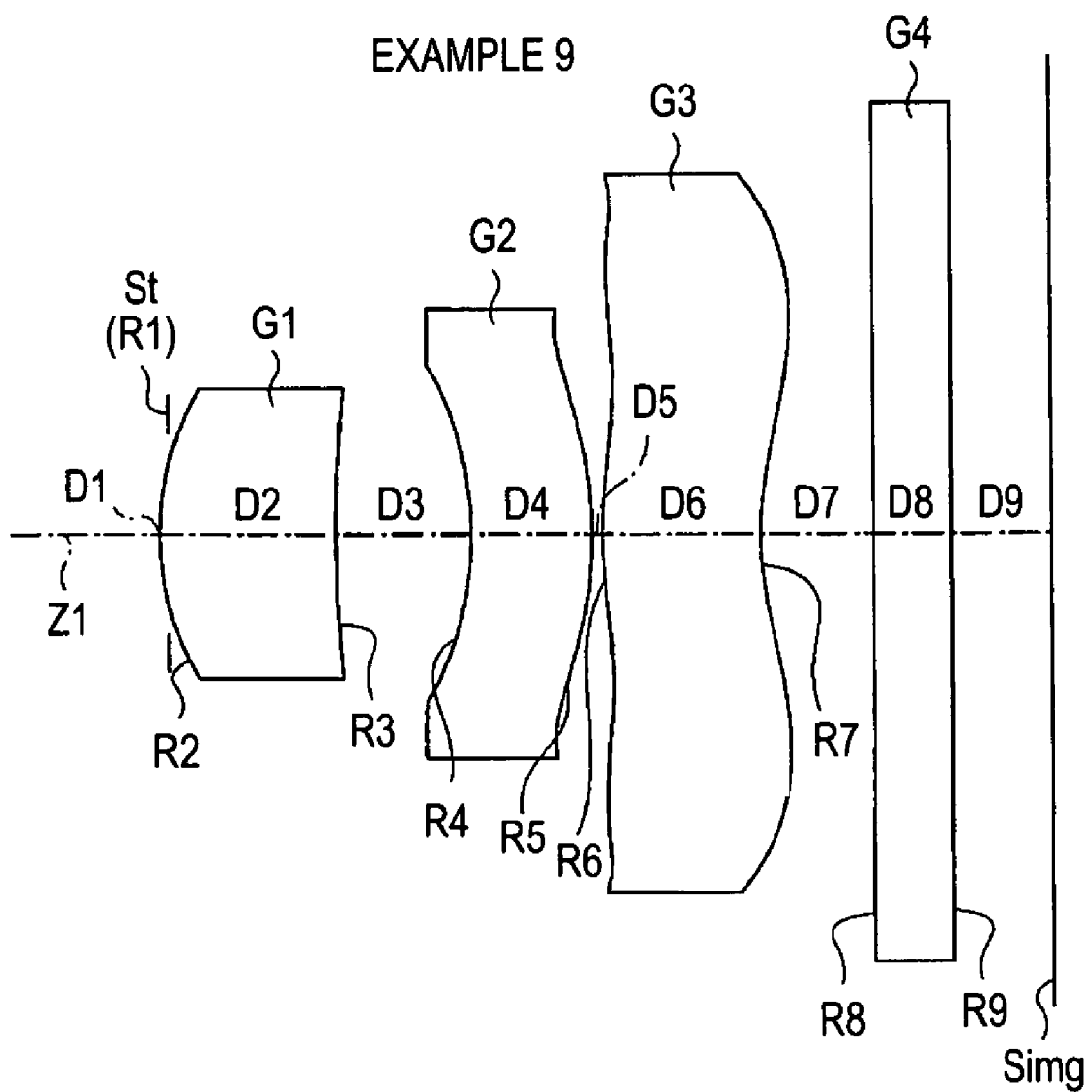
FIG. 9 is a lens sectional view corresponding to an imaging lens according to example 9 of the invention.

FIG. 1 shows a first arrangement example of an imaging lens according to an embodiment of the invention. This arrangement example corresponds to the lens arrangement in a first numerical example (FIGS. 10A and 10B), referred later. FIGS. 2 to 9 show second to ninth arrangement examples wherein the arrangements of FIGS. 2 to 9 correspond to the lens arrangements of second to ninth numerical examples (FIGS. 11A-18A and FIGS. 11B-18B). In FIGS. 1 to 9, reference numeral Ri represents a radius-of-curvature of an i-th surface whose subscript is provided to increase as the image is neared provided that the constituent element closest to the object is taken as the first. Reference numeral Di represents a surface-to-surface spacing between the i-th and (i+1)-th surfaces on an optical axis Z1. Note that the explanation below is basically on the first arrangement example shown in FIG. 1 because the arrangements are similar one to another in respect of the basic structure.

The imaging lens is suitable for use in various imaging appliances using imaging devices such as of CCD and CMOS, e.g. cellular phones, digital still cameras and digital video cameras. The imaging lens includes a first lens G1, a second lens G2 and a third lens G3, in the closer order to the object on the optical axis Z1. An optical aperture stop St is arranged in front of the first lens G1, specifically, closer to the object than the image-side surface of the first lens G1 on the optical axis Z1.

An imaging device, such as a CCD, is arranged on an image surface Simg of the imaging lens. Between the third lens G3 and the imaging device, various optical members GC are arranged in accordance with the camera structure the relevant lens is to be mounted. For example, plate-like optical members are arranged which include an image-surface-protecting cover glass and an infrared-blocking filter.

The first lens G1 is made as a positive meniscus lens having a convex surface facing to the object. The second lens G2 is as a positive or negative meniscus lens having a concave surface facing to the object. The third lens G3 is as a positive or negative lens formed aspheric in form at both surfaces.

The third lens G3 preferably has an object-side surface that is formed convex in an area nearby the optical axis and concave in a peripheral area. Meanwhile, the third lens G3 preferably has an image-side surface that is formed concave in an area nearby the optical axis and convex in a peripheral area. Incidentally, the first and second lenses G1, G2 are preferably aspheric lenses in order to correct for aberrations. Particularly, both the second and third lenses G2, G3 are preferably aspheric lenses in order to correct for aberrations, particularly, by the arrangement of as less as three lenses. In such a case, because a plastic lens is advantageous in forming an aspheric lens, the second and third lenses G2, G3 are preferably plastic lenses.

The imaging lens satisfies the following conditions, wherein vd1 is an Abbe number of the first lens G1, vd2 is an Abbe number of the second lens G2, vd3 is an Abbe number of the third lens G3, f is a focal length of the system overall, f1 is a focal length of the first lens G1, f2 is a focal length of the second lens G2, and f3 is a focal length of the third lens G3.

$$vd1>50 \tag{1}$$

$$vd3>50 \tag{2}$$

$$0.7<f1/f<1.0 \tag{3}$$

$$-0.9<f2/\{f3\cdot(45-vd2)\}<0.4 \tag{4}$$

Description is now made on the operation and effect of the imaging lens constructed as above.

The imaging lens can provide a lens system that is advantageous in reducing the overall length and securing a telecentricity by virtue of the aperture stop St arranged closest to the object through use of the arrangement of as less as three lenses in total. Furthermore, by satisfying the conditional expressions, optimization is achieved for the material of and the power distribution over the lenses, thus obtaining a lens system smaller in size but higher in performance in a manner compatible with increasing pixel density. The present imaging lens secures a telecentricity by placing the optical aperture stop St in a position closest to the object. However, where the aperture stop St is placed frontward, the sensitivity-in-manufacture increases, e.g. variations easily occur in the image surface in the presence of a lens positional deviation upon manufacture. In the imaging lens, by making the first lens G1 in a positive meniscus form whose convex surface faces to the object and by properly controlling the power of the second and third lenses G2, G3 and the dispersion at the second lens G2, the variation on the image surface due to positional deviation is reduced while relieving the chromatic aberration, thus obtaining a lens system excellent in manufacture aptitude. Meanwhile, in the imaging lens, by providing different forms to the aspheric surface of the third lens G3 closest to the image surface at between the central and peripheral areas thereof, curvature-of-field is well corrected over between the central and peripheral portions of the image area. Meanwhile, telecentricity is advantageously secured, i.e. the rays of light are allowed to enter the imaging-device surface at an angle of nearly vertical, at between the central and peripheral areas of the image surface.

The conditional expressions (1), (2) define a lens material suited for the first and third lenses G1, G3. In case going below the lower limit of the conditional expression (1), (2), magnification-chromatic aberration is not balanced unpreferably. The conditional expression (3) defines a power suited for the first lens G1 located closest to the object. In case going below the lower limit of the conditional expression (3), overall-length reduction is advantageously effected. However, because overall-length reduction is forcible, balance is provided poor in between sagittal curvature-of-field and tangential curvature-of-field. Conversely, if the upper limit is exceeded, chromatic aberration improves but the overall length undesirably increases.

The conditional expression (4) defines a proper balance of between the power (1/f2) of the second lens G2 and power (1/f3) of the third lens G3 and the dispersion at the second lens, which contributes to the reduction of chromatic aberration over the lens system overall. In case going out of the upper or lower limit of the conditional expression (4), balance becomes poor between axial and magnification-chromatic aberrations. The power balance of between the second and third lenses G2, G3 is significant for relieving the overall chromatic aberration. In such a case, power is preferably provided weak to the second lens G2 where a material having a small Abbe number is used for the second lens G2. Conversely, where the second lens G2 has a great Abbe number vd2, power is preferably provided intense to the second lens G2. By satisfying the conditional expression (4), proper control is made for the powers of the second and third lenses G2, G3 through an Abbe number vd2 of 45 as a boundary.

As explained so far, according to the imaging lens of the embodiment, the aperture stop St is arranged closest to the object by means of the arrangement having lenses as less as three in total. Furthermore, by satisfying the predetermined conditional expressions, optimization is made for the material of and the power distribution over the lenses. This can achieve a lens system smaller in size but higher in performance that is compatible with increasing pixel density.

EXAMPLES

Now explanation is made on concrete numerical examples of the imaging lens in the present embodiment. First to ninth numerical examples will be explained collectively in the following.

FIGS. 10A and 10B show the numerical data of the imaging lens according to example 1. Particularly, FIG. 10A shows the basic lens data thereof while FIG. 10B the data concerning aspheric surfaces. In the column of the surface number Si concerning the lens data shown in FIG. 10A, the surface of the constituent element closest to the object is taken as the first, to show the number of the i-th (i=1–9) surface given a symbol gradually increasing as the image end is neared. In the column of the radius-of-curvature Ri, shown is a value of radius-of-curvature (mm) of the i-th surface as counted in the closer order to the object correspondingly to the reference Ri given in FIG. 1. In the column of the surface-to-surface spacing Di, shown is a spacing (mm) on the optical axis at between the i-th surface Si and the (i+1)-th surface (Si+1) as similarly counted in the closer order to the object. Ndi represents a value of refractive index at d-line (wavelength: 587.6 nm) at between the adjacent lens surfaces. In the column of vdj, shown is an Abbe number at d-line of the optical element located j-th (j=1-4) as counted in the closer order to the object.

The imaging lens in example 1 is made aspheric in form at both surfaces of the first, second and third lenses G1, G2, G3. In the basic lens data in FIG. 10A, the aspheric surfaces are shown with numerals of radius-of-curvature at or around the optical axis. In the numerals shown as aspheric data in FIG. 10B, the symbol "E" represents that the following numeral is a "power exponent" having a bottom of 10 wherein the numeral represented by an exponential function, having such a bottom 10, is to be multiplied on the numeral preceding "E". For example, "1.0E-02" if given represents "1.0×10⁻²".

As for aspheric data, the values of coefficients Bi, KA are shown that are given in the aspheric-form expression represented by the following expression (A). Specifically, Z represents the length (mm) of a vertical line drawn from a point, on the aspheric surface and located at a height h with respect to the optical axis Z1, onto a tangential plane to the apex of the aspheric surface (a plane vertical to the optical axis Z1). The imaging lens in example 1 is expressed by effectively using third-to-tenth order coefficients $B_3$-$B_{10}$ on the assumption the spherical surfaces are of respective aspheric coefficients Bi.

$$Z=C\cdot h^2/\{1+(1-KA\cdot C^2\cdot h^2)^{1/2}+\Sigma B_i\cdot h^i\} \quad (A)$$

(i=3-10)

where

Z: depth of the aspheric surface (mm)

h: distance (height) of from the optical surface to the lens surface (mm)

KA: eccentricity (second-order aspheric coefficient)

C: paraxial curvature=1/R (R: paraxial radius-of-curvature)

$B_i$: i-th aspheric coefficient

Similarly to the imaging lens of example 1, FIGS. 11A to 18A show the basic lens data of imaging lenses according to examples 2 to 9. Likewise, FIGS. 11B to 18B show the aspheric-surface data of an imaging lenses according to examples 2 to 9. Incidentally, concerning any one of the imaging lenses of examples 2 to 9, the first, second and third lenses G1, G2, G3 are made aspheric in form at both surfaces thereof similarly to example 1.

FIG. 19 shows the values related to the foregoing conditional expressions. Note that, in FIG. 19, the reference f represents a paraxial focal length (mm) of the overall system. The references f1, f2 and f3 respectively denote paraxial focal length (mm) of the first, second and third lenses G1, G2 and G3. As seen from FIG. 19, the examples have values fallen within the numeral ranges of the respective conditional expressions.

FIGS. 20A to 20C respectively show a spherical aberration, an astigmatism (curvature of field) and a distortion, of the imaging lens of example 1. In the aberration diagrams, aberrations are shown also at C-line (wavelength: 656.27 nm) and at F-line (wavelength: 486.13 nm) by taking d-line as a reference wavelength. In the astigmatism diagram, "S" represents an aberration in a sagittal direction while "T" an aberration in a tangential direction, wherein "ω" represents a half angle-of-view. Incidentally, in FIG. 20A, entrance pupil diameter (mm) is denoted on the vertical axis.

Figures 21A, 21B, 21C:
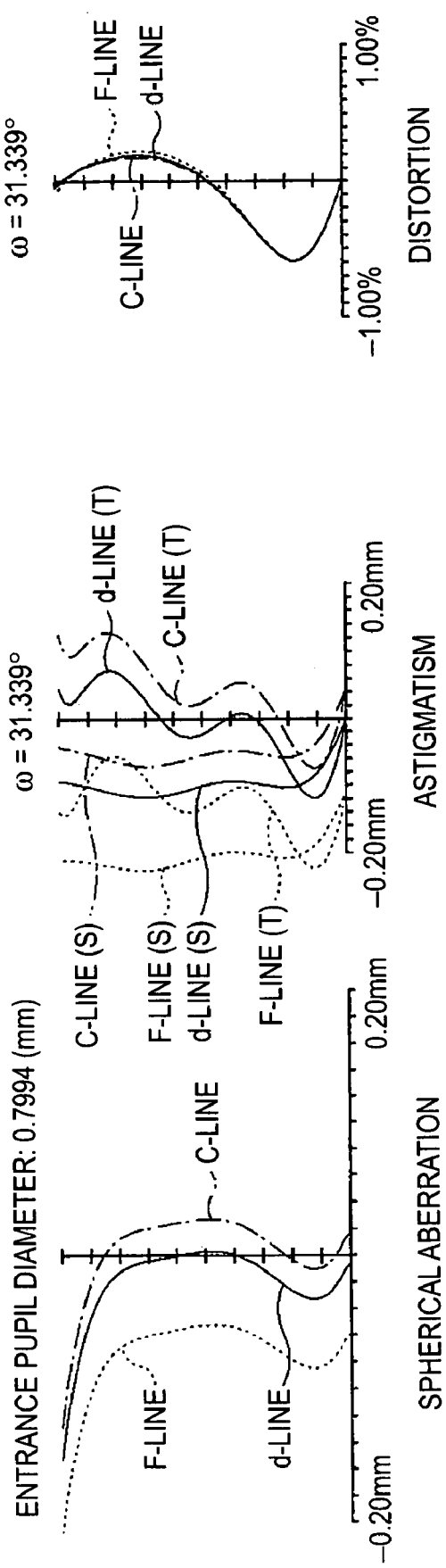
Figure 28C:
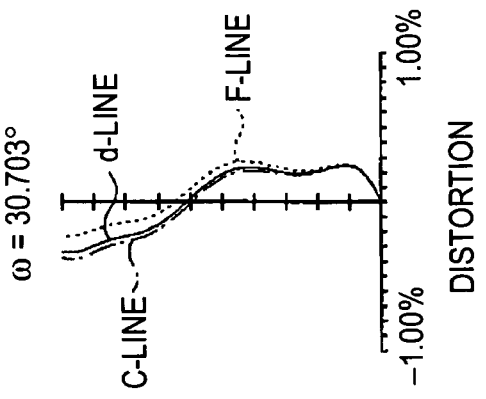
Figure 28B:
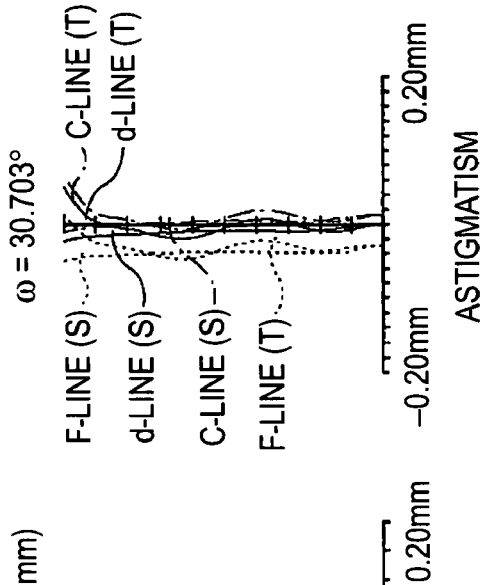
Figure 28A:
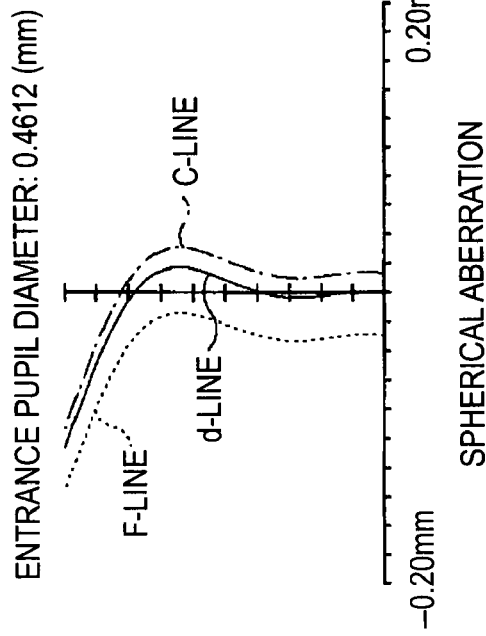

Likewise, FIGS. 21A-21C show the aberrations as to the imaging lens of example 2, FIGS. 22A-22C show the aberrations as to the imaging lens of example 3, FIGS. 23A-23C show the aberrations as to the imaging lens of example 4, FIGS. 24A-24C show the aberrations as to the imaging lens of example 5, FIGS. 25A-25C show the aberrations as to the imaging lens of example 6, FIGS. 26A-26C show the aberrations as to the imaging lens of example 7, FIGS. 27A-27C show the aberrations as to the imaging lens of example 8, and FIGS. 28A-28C show the aberrations as to the imaging lens of example 9.

As can be seen from the numerical-value data and the aberration diagrams, optimization is achieved for the lens material, the lens surface form and the power distribution over lenses of each example by the totally three-lens arrangement, thus realizing an imaging lens system smaller in size but higher in performance.

The invention is not limited to the embodiment and examples but can be modified in various ways. For example, the radius-of-curvature, the surface-to-surface spacing, the refractive index, etc. of each lens component are not limited to the values but can take other values.

According to the imaging lens of the invention, there are provided an aperture stop, a first lens in a positive meniscus form having a convex surface facing toward the object, a second lens in a positive or negative meniscus form having a concave surface facing toward the object, and a third lens positive or negative in an aspheric form at both surfaces, wherein optimization is achieved for the material of and the power distribution over the lenses by satisfying predetermined conditional expressions. Accordingly, a lens system can be realized that is small in size but high in performance in a manner compatible with pixel-density increase.

The entire disclosure of each and every foreign patent application from which the benefit of foreign priority has been claimed in the present application is incorporated herein by reference, as if fully set forth.

What is claimed is:

1. An imaging lens comprising, in order from an object side:

an aperture stop;

a first lens having a positive refractive power in a meniscus form having a convex surface facing toward the object;

a second lens having a negative refractive power in a meniscus form having a concave surface facing toward the object; and a third lens having a negative refractive power in an aspheric form at both surfaces, wherein conditional expressions given below are satisfied:

$$vd1>50 \quad (1)$$

$$vd3>50 \quad (2)$$

$$0.7<f1/f<1.0 \quad (3)$$

$$-0.9<f2/\{f3\cdot(45-vd2)\}\leq-0.08 \quad (4'')$$

where vd1: Abbe number of the first lens, vd2: Abbe number of the second lens, vd3: Abbe number of the third lens, f: Focal length of an overall system, f1: focal length of the first lens, f2: focal length of the second lens, and f3: focal length of the third lens.

2. An image lens according to claim 1, wherein the second lens and the third lens are plastic lenses.

3. An image lens according to claim 1, wherein the third lens has a surface closer to an image formed concave in form at and around an optical axis and convex in form at an periphery thereof.

4. An image lens according to claim 2, wherein the third lens has a surface closer to an image formed concave in form at and around an optical axis and convex in form at an periphery thereof.

5. An imaging lens according to claim 1, wherein a cover glass and a filter are arranged between the third lens and an imaging device.

6. An imaging lens according to claim 1, wherein an object-side surface of the third lens that is formed convex in an area nearby the optical axis and concave in a peripheral area.

7. An imaging lens according to claim 1, wherein the first, second and third lenses have aspheric surfaces.

8. An imaging lens according to claim 1, wherein the first and the third lenses have the same Abbe numbers.

9. An imaging lens according to claim 1, wherein the aperture stop is located between the object side surface of the first lens and the image side surface of the first lens, along the optical axis.

10. An imaging lens comprising, in order from an object side:

an aperture stop;

a first lens having a positive refractive power in a meniscus form having a convex surface facing toward the object;

a second lens having a positive refractive power in a meniscus form having a concave surface facing toward the object; and a third lens having a negative refractive power in an aspheric form at both surfaces, wherein conditional expressions given below are satisfied:

$$vd1 > 50 \quad (1)$$

$$vd3 > 50 \quad (2)$$

$$0.7 < f1/f < 1.0 \quad (3)$$

$$0.15 < f2/\{f3 \cdot (45 - vd2)\} < 0.4 \quad (4''')$$

vd1: Abbe number of the first lens,
vd2: Abbe number of the second lens,
vd3: Abbe number of the third lens,
f: Focal length of an overall system,
f1: focal length of the first lens,
f2: focal length of the second lens, and
f3: focal length of the third lens.

11. An image lens according to claim 10 wherein the second lens and the third lens are plastic lenses.

12. An image lens according to claim 10 wherein the third lens has a surface closer to an image formed concave in form at and around an optical axis and convex in form at an periphery thereof.

13. An image lens according to claim 11 wherein the third lens has a surface closer to an image formed concave in form at and around an optical axis and convex in form at an periphery thereof.

14. An imaging lens according to claim 10, wherein a cover glass and a filter are arranged between the third lens and an imaging device.

15. An imaging lens according to claim 10, wherein an object-side surface of the third lens that is formed convex in an area nearby the optical axis and concave in a peripheral area.

16. An imaging lens according to claim 10, wherein the first, second and third lenses have aspheric surfaces.

17. An imaging lens according to claim 10, wherein the first and the third lenses have the same Abbe numbers.

18. An imaging lens according to claim 10, wherein the aperture stop is located between the object side surface of the first lens and the image side surface of the first lens, along the optical axis.

* * * * *